(12) United States Patent
Sonawane et al.

(10) Patent No.: US 11,822,573 B2
(45) Date of Patent: Nov. 21, 2023

(54) CREATION AND MAINTENANCE OF HIERARCHICAL INDUSTRIAL ASSET DATASETS

(71) Applicant: Baker Hughes Holdings LLC, Houston, TX (US)

(72) Inventors: Karan Sonawane, Mumbai (IN); Shreyas Lele, Mumbai (IN); Mangesh Dashmukhe, Pune (IN); Sandeep Patil, Mumbai (IN)

(73) Assignee: Baker Hughes Holdings LLC, Houston, TX (US)

( * ) Notice: Subject to any disclaimer, the term of this patent is extended or adjusted under 35 U.S.C. 154(b) by 115 days.

(21) Appl. No.: 17/348,347

(22) Filed: Jun. 15, 2021

(65) Prior Publication Data
US 2022/0398257 A1 Dec. 15, 2022

(51) Int. Cl.
*G06F 16/27* (2019.01)
*G06F 16/22* (2019.01)

(52) U.S. Cl.
CPC .......... *G06F 16/278* (2019.01); *G06F 16/221* (2019.01); *G06F 16/2246* (2019.01); *G06F 16/2282* (2019.01)

(58) Field of Classification Search
CPC ............... G06F 16/221; G06F 16/2246; G06F 16/2255; G06F 16/2282; G06F 16/27; G06F 16/273; G06F 16/275; G06F 16/278; G06F 16/282
See application file for complete search history.

(56) References Cited

U.S. PATENT DOCUMENTS

| | | | | |
|---|---|---|---|---|
| 6,556,983 B1 * | 4/2003 | Altschuler | ........... | G06K 9/6296 |
| | | | | 707/E17.011 |
| 9,104,665 B1 * | 8/2015 | Bik | ...................... | G06F 11/1451 |
| 2011/0088000 A1 * | 4/2011 | Mackay | .................. | G06T 19/00 |
| | | | | 715/853 |
| 2016/0063037 A1 * | 3/2016 | Savkli | .................... | G06F 16/532 |
| | | | | 707/722 |
| 2017/0060912 A1 * | 3/2017 | Liu | ........................ | G06F 16/215 |
| 2019/0102154 A1 * | 4/2019 | Koupy | .................. | G06F 16/278 |
| 2022/0156288 A1 * | 5/2022 | Feng | ..................... | G06F 3/0649 |

FOREIGN PATENT DOCUMENTS

| | | | | |
|---|---|---|---|---|
| EP | 3816817 A1 * | 5/2021 | ............. | G06F 16/16 |
| WO | WO-2021056243 A1 * | 4/2021 | ........... | G06F 16/182 |

* cited by examiner

*Primary Examiner* — James E Richardson
(74) *Attorney, Agent, or Firm* — MINTZ LEVIN COHN FERRIS GLOVSKY AND POPEO, PC (57) ABSTRACT

In one implementation, a method includes receiving data characterizing a hierarchical dataset associated with hierarchical industrial assets. The hierarchical dataset can include a plurality of node data that can include a plurality of asset data and a plurality of edge data. An edge datum of the plurality of edge data is indicative of a relation between a pair of node data of the plurality of node data. Each node datum of the plurality of node data represents an asset in the hierarchical industrial asset and each edge datum of the plurality of edge data represents an edge in the hierarchical industrial asset. The method further includes receiving data characterizing a partition identifier associated with the hierarchical dataset can be received. The method also includes assigning, based on the partition identifier, a partition of a database to the hierarchical dataset. The method further includes storing the hierarchical dataset in the assigned partition.

21 Claims, 5 Drawing Sheets

| Asset / Edge Name | Hash ID | Local ID | Partition ID | Asset Type | Asset Information | Asset Layer |
|---|---|---|---|---|---|---|
| System 1 | Hash ID #1 | 001 | 1 | Enterprise | Location | 4 |
| System 2 | Hash ID #2 | 002 | 1 | Machine Train | Pressure | 3 |
| Link 1 | Hash ID #3 | 003 | 1 | E1 Link | | |
| System 3 | Hash ID #4 | 004 | 1 | Machine | Temp | 2 |
| Link 2 | Hash ID #5 | 005 | 1 | E2 Link | | |
| System 4 | Hash ID #6 | 006 | 1 | Bearing | Temp | 1 |
| Link 3 | Hash ID #7 | 007 | 1 | E1 Link | | |

| Edge Name | Hash ID | Local ID | Source ID | Target ID | Edge Type |
|---|---|---|---|---|---|
| Link 1 | Hash ID #3 | 003 | 001 | 002 | E1 Link |
| Link 2 | Hash ID #5 | 005 | 002 | 004 | E2 Link |
| Link 3 | Hash ID #7 | 007 | 004 | 006 | E1 Link |

FIG. 5

CREATION AND MAINTENANCE OF HIERARCHICAL INDUSTRIAL ASSET DATASETS

BACKGROUND

A database is an organized collection of structured information, or data, typically stored electronically in a computer system. Data within a database can be modeled in rows and columns (e.g., in a series of tables) to make processing and data querying efficient. The data can then be easily accessed, managed, modified, updated, controlled, and organized.

The database management system (DBMS) is the software that interacts with end users, applications, and the database itself to capture and analyze the data. The DBMS software additionally encompasses the core facilities provided to administer the database. In some implementations, the DBMS can includes computer hardware running system software for creating and managing databases. The DBMS provides users and programmers with a systematic way to create, retrieve update and manage data in a database. Examples of databases include relational database, flat database, object oriented database, hierarchical database, and the like.

SUMMARY

Various aspects of the disclosed subject matter may provide one or more of the following capabilities.

In one implementation, a method includes receiving data characterizing a hierarchical dataset associated with hierarchical industrial assets. The hierarchical dataset can include a plurality of node data that can include a plurality of asset data and a plurality of edge data. An edge datum of the plurality of edge data is indicative of a relation between a pair of node data of the plurality of node data. Each node datum of the plurality of node data represents an asset in the hierarchical industrial asset and each edge datum of the plurality of edge data represents an edge in the hierarchical industrial asset. The method further includes receiving data characterizing a partition identifier associated with the hierarchical dataset can be received. The method also includes assigning, based on the partition identifier, a partition of a database to the hierarchical dataset. The method further includes storing the hierarchical dataset in the assigned partition.

One or more of the following features can be included in any feasible combination.

In some implementations, the method includes creating the partition in the database, wherein the partition identifier is a new partition identifier. In some implementations, the method further includes identifying the partition in the database. The partition identifier is a previously defined partition identifier. In some implementations, the method further includes storing the plurality of asset data in a node table that includes a plurality of rows and a plurality of columns. Each asset datum of the plurality of asset data includes a plurality of asset properties. A first asset datum of the plurality of asset data is assigned a first row of the plurality of rows. A first asset property of the first asset datum is assigned a first column of the plurality of columns and a second asset property of the first asset datum is assigned a second column of the plurality of columns. The node table is stored in the assigned partition.

In some implementations, the method further includes storing the plurality of edge data in the node table. Each edge datum of the plurality of edge data includes a plurality of edge properties. A first edge datum of the plurality of edge data is assigned a second row of the plurality of rows. A first edge property of the first edge datum is assigned a third column of the plurality of columns and a second edge property of the first edge datum is assigned a fourth column of the plurality of columns. In some implementations, the plurality of asset data includes a plurality of user-defined asset identifiers and a plurality of edge data includes a plurality of user-defined edge identifier. Each user-defined asset identifier of the plurality of user-defined asset identifiers is indicative of a unique asset or a unique edge of the hierarchical industrial assets.

In some implementations, the method further includes storing the plurality of user-defined asset identifiers or user-defined edge identifier in a hash table associated with the database. The hash table includes a plurality of rows and a plurality of columns. A first asset of the hierarchical industrial assets is assigned a first row of the plurality of rows in the hash table, and the plurality of user-defined asset identifiers are assigned a first column of the plurality of columns. The method also includes generating a plurality of hash identifiers by hashing each of the plurality of user-defined asset identifiers; and storing the plurality of hash identifiers in a second column of the hash table.

In some implementations, the method further includes providing a hierarchical dataset template including a plurality of asset templates and a plurality of edge templates. The received hierarchical dataset is generated by at least populating a first asset data of the plurality of assets data in a first asset template of the plurality of asset templates, and by at least populating a first edge data of the plurality of edge data in a first edge template of the plurality of edge templates. In some implementations, the method further includes assigning a first set of local identifiers to the hierarchical dataset. Each local identifier of the first set of local identifier is associated with a unique asset datum or a unique edge datum in the hierarchical dataset. The hierarchical industrial assets include one or more of pumps, compressors, turbines, shafts, shaft coupling, input bearings, output bearings and machine train.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Industrial sites (e.g., oil and gas industrial sites) can include multiple industrial assets (e.g., machines, motors, drills, etc.). The industrial assets can be operationally or physically related to each other. For example, a first asset can be a part of a second asset, the output of the first asset can be an input to the second asset, the first asset can be mechanically coupled to the second asset, etc. In some implementations, the industrial assets at an industrial site can form a hierarchy (e.g., a primary asset can include multiple secondary assets which in turn can include multiple tertiary assets and/or output of multiple secondary assets can be directed to a primary assets). For a given industrial site, large amount of operational data (e.g., operating parameters of the industrial assets, sensor measurements at the industrial assets, etc.) and relational data (e.g., hierarchical relationship of the industrial assets) can be generated. It can be desirable to store and maintain the aforementioned data in a database. In some implementations, the database can store data from multiple industrial sites and/or multiple hierarchical assets at a given industrial site.

Storing large amount of data (e.g., data associated with one or more hierarchical industrial assets or hierarchical datasets) in a database can be challenging. Existing database management systems (DBMS) handle large dataset by partitioning the database into multiple partitions and by saving different portions of the dataset in different partitions. However, it can be undesirable to store data associated with a hierarchical industrial asset in multiple partitions. For example, storing hierarchical dataset in multiple partitions can be inefficient (e.g., may require dividing the hierarchical asset data into multiple parts). Additionally, storage of hierarchical asset data (e.g., dividing and saving the dataset into multiple dataset) may be handled internally by the DBMS without any input from the user. Furthermore, retrieval of hierarchical asset data may be require working with multiple partitions that can slow the retrieval process.

In some implementations of current subject matter, data associated with a hierarchical industrial asset can be stored in a single partition of the database. A user can control the storage process. For example, the user can instruct the DBMS to store the hierarchical dataset in an existing partition of the database or dynamically create a new partition in the database and store the hierarchical dataset therein. In some implementations of the current subject matter, hierarchical dataset can be transferred from the user to the database in a predetermined data template. For example, the user computing system can be provided with the predetermined data template (e.g., via an API call). The data provided by the user can be organized based on the template and transferred to the database (e.g., via a second API call). The database can receive the organized data and store the data in a partition of the database (e.g., based on user instruction). Organization of the received data in the predetermined template can improve (e.g., optimize) the process of storing the data (e.g., the storing process may require less time). In some implementations, the database, information of the hierarchical dataset can be stored in a hash table, a node table and an edge map table. Storing the hierarchical dataset (e.g., operational data, relational data, etc.) in a single partition of the database (e.g., in a previously generated partition or in a dynamically generated partition based on user input) based on a predetermined template can allow for efficient management and retrieval (e.g., selectively retrieval) of data.

Figure 1:
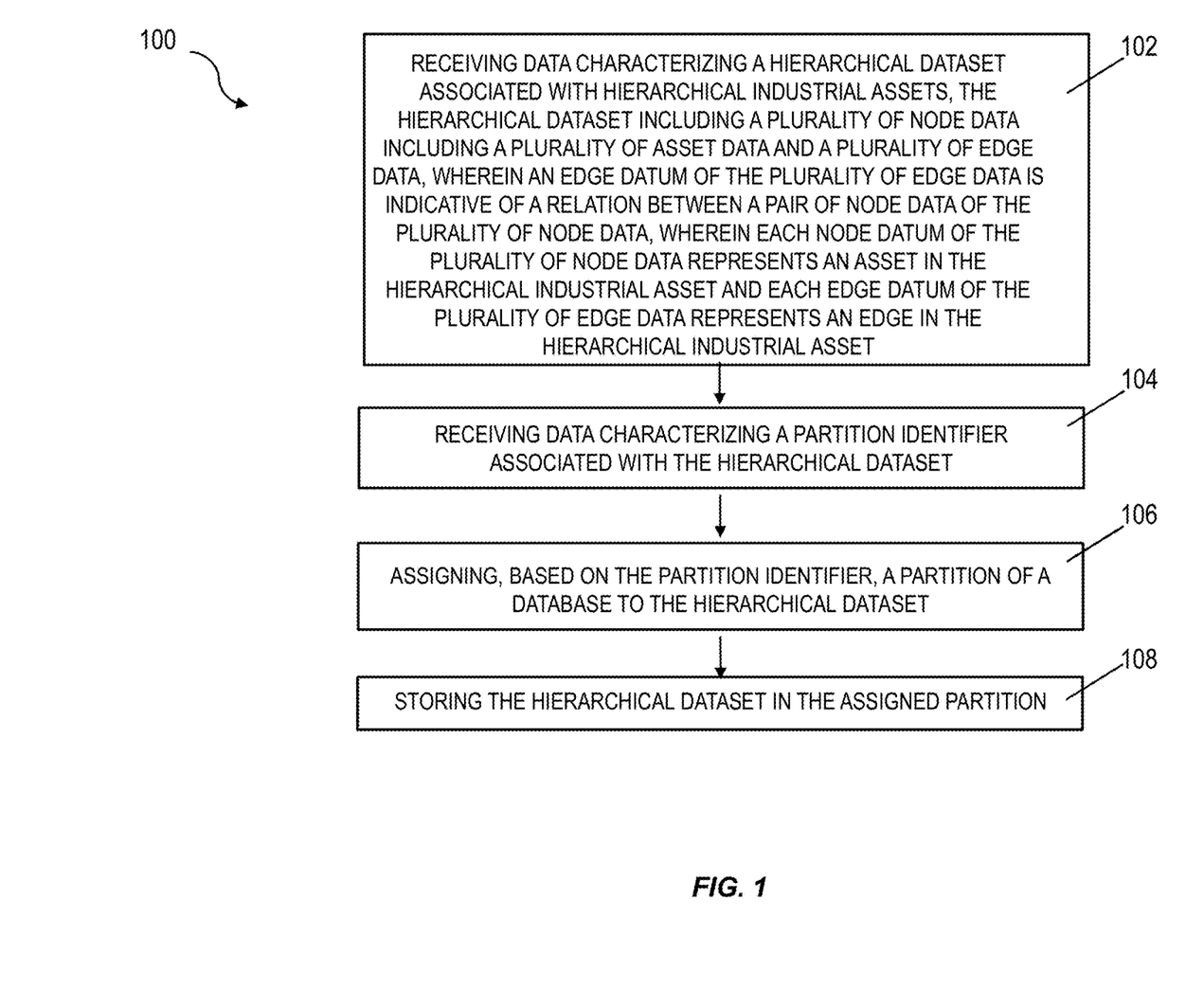
FIG. 1 is a flow chart of an exemplary method for generating a hierarchical industrial dataset.

FIG. 1 is a flow chart of an exemplary method for a generating a hierarchical industrial dataset. At step 102, data characterizing a hierarchical dataset associated with hierarchical industrial assets can be received. For example, a user or a customer can provide the hierarchical dataset to a DBMS of a database for storage. The hierarchical dataset can include a plurality of asset data and a plurality of edge data. An edge datum of the plurality of edge data is indicative of a relationship between a pair of asset data of the plurality of asset data. Each asset datum of the plurality of asset data represents an asset in the hierarchical industrial asset and each edge datum of the plurality of edge data represents an edge in the hierarchical industrial asset.

Figure 2:
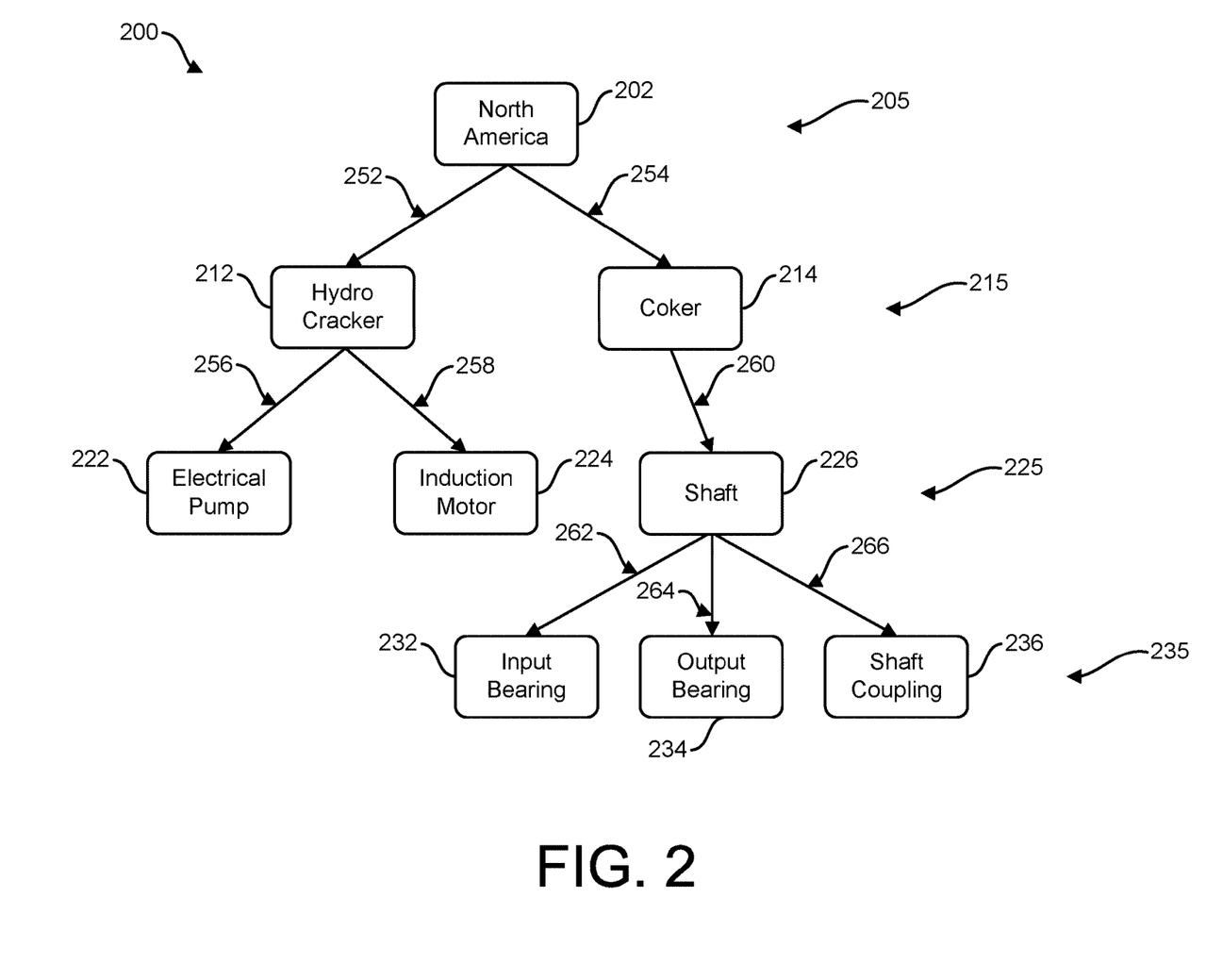
FIG. 2 illustrates an exemplary framework for generating a hierarchical industrial dataset.

FIG. 2 illustrates an exemplary schematic framework of a hierarchical industrial asset 200. The hierarchical industrial asset includes multiple interrelated assets 202-236 that form a hierarchy. The hierarchical industrial asset can include one or more of pumps, compressors, turbines, shafts, shaft coupling, input bearings, output bearings and machine train. The relationship between a pair of assets is described by an edge. An asset is represented by a rectangular shape and an edge is represented by an arrow. The hierarchical industrial asset 200 can include multiple asset layers associated with the various hierarchies. Each asset layer can include multiple assets. For example, the hierarchical industrial asset 200 can include a first asset layer 205, a second asset layer 215, a third asset layer 225 and a fourth asset layer 235. Each asset layer can include one or more assets. For example, the first asset layer 205 includes North America site 202; the second asset layer 215 includes a hydro cracker 212 and a coker unit 214; the third asset layer includes an electrical pump 222, and induction motor 224 and a shaft 226; and the fourth asset layer 235 includes an input bearing 232, an output bearing 234 and a shaft coupling 236. In some implementations, an edge originates from a first asset in a first layer and terminates at a second asset in a second layer. The first asset layer 205, the second asset layer 215, the third asset layer 225 and the fourth asset layer 235 are arranged in the order of decreasing hierarchical value (e.g., assets in the first asset layer 205 can have the highest hierarchical value and assets in the fourth asset layer 235 can have lowest hierarchical value in the hierarchical industrial asset 200).

The various assets can have an asset type. For example, the North America site 202 is an enterprise (e.g., indicative of the name/location of the hierarchical industrial asset 200). The hydro cracker 212 and coker unit 214 are machine trains; electrical pump 222, induction motor 224, shaft 226 and shaft coupling 236 are machines; and input bearing 232 and output bearing 234 are bearings. The various assets can be interrelated and the relation between a pair of assets can be represented by an edge (e.g., one of edges 252-264). For example, edge 252 and edge 254 represent the relationship between North America site 202 and hydro cracker 212 and coker unit 214, respectively (e.g., that hydro cracker 212 and coker unit 214 are located at the North America site). Edge 260 represents relationship between coker unit 214 and shaft 226, and edge 262 represents a relationship between shaft 226 and input bearing 232. Together, assets that are interconnected by one or more edges can be described as forming a hierarchical chain. For example, North America site 202, coker unit 214, shaft 226 and input bearing 232 that are connected by edges 254, 260 and 262 can be described as forming a hierarchical chain.

The hierarchical dataset associated with the hierarchical industrial asset 200 can include a plurality of asset data associated with the different assets (e.g., assets 202-236) of the hierarchical industrial asset 200. The hierarchical dataset can also include a plurality of edge data that includes data associated with the different edges (e.g., edges 252-266) of the hierarchical industrial asset 200. An edge datum of the plurality of edge data is indicative of a relation between a pair of asset data of the plurality of asset data. For example, a first edge data associated with the edge 252 (or edge 254) can be indicative of relation between North America site 202 and hydro cracker 252 (or coker unit 214). In some implementations, each asset datum of the plurality of asset data represents an asset in the hierarchical industrial asset 200 and each edge datum of the plurality of edge data represents an edge in the hierarchical industrial asset 200.

The hierarchical dataset can include various information associated with the assets and/or edges of the hierarchical industrial asset provided by the user (e.g., user-defined asset/edge identifier (ID), asset type, asset properties, etc.). The asset/edge ID can be identifiers associated with asset/edge that are assigned by the user (or customer operating the industrial asset). The user can use the assigned asset/edge IDs to retrieve asset/edge data from the database. The asset properties can include, for example, operational information of the assets (e.g., operation parameters, temperature, pressure, etc.).

In some implementations, hierarchical dataset template including a plurality of node templates and a plurality of edge templates can be provided. For example, the DBMS can provide the hierarchical dataset template to the user's computing system (e.g., via an application programming interface [API] call). The user's computing system can generate the hierarchical dataset by populating the hierarchical dataset template. For example, asset templates and edge templates of the hierarchical dataset template can be populated with asset data and edge data, respectively (e.g. a first asset data of the plurality of assets data can be populated in a first asset template of the plurality of asset templates, a first edge data of the plurality of edge data can be populated in a first edge template of the plurality of edge templates, etc.). Structuring the hierarchical dataset based on predetermined hierarchical dataset template can be improve the process of storage of the hierarchical dataset. For example, the DBMS can efficiently handle the hierarchical dataset (e.g., automatically store different portions of the hierarchical dataset into predetermined table, performing hashing of asset/edge ID, etc.) when the hierarchical dataset is organized in a predetermined format. This can improve the storage of the hierarchical dataset (e.g., reduce the storage time).

Returning to FIG. 1, at step 104, data characterizing a partition identifier associated with the hierarchical dataset can be received. The database can be divided into one or more partitions. In current implementations, a given dataset can be divided into multiple portions and stored in different partitions of the database. This may not be desirable. The user can instruct the DBMS to store the hierarchical dataset in a single partition. For example, the user can provide the partition identifier to the DBMS that can be indicative of the partition of the dataset where the hierarchical dataset can be stored.

At step 106, a partition of a database can be assigned to the hierarchical dataset based on the partition identifier. In some implementations, if the partition identifier is a new value (e.g., when the partition associated with the identifier does not already exist), the DBMS can create a new partition, and store the hierarchical dataset in the newly generated partition. In some implementations, if the partition identifier is a previously defined partition identifier (e.g., when the partition associated with the identifier has been previously created), the DBMS can store the hierarchical dataset in a previously generated partition. For example, the DBMS can identify the partition in the database associated with the partition identifier, and store the hierarchical dataset therein.

At step 108, the hierarchical dataset is stored in the assigned partition. The hierarchical dataset can include asset information provided by the user (e.g., user-defined asset/edge identifiers, partition identifiers, asset name, asset type, asset properties, etc.). For example, the hierarchical dataset can include a plurality of user-defined asset/edge identifiers where each user-defined asset identifier of the plurality of user-defined asset identifiers is indicative of a unique asset or a unique edge of the hierarchical industrial asset. The asset/edge identifier are provided by the user and the user can use it to track and retrieve asset data from the database.

In addition, new properties can be assigned to the hierarchical dataset (e.g., by the DBMS). For example, a unique hash identifier can be generated for each user-defined asset/edge identifiers. An asset data in the database can be identified based on its hash identifier. A local identifier can also be assigned to each asset data stored in a partition (e.g., by the DBMS). For example, a first set of local identifiers can be assigned to asset/edge data of a hierarchical dataset stored in a partition. Each local identifier of the first set of local identifier is associated with a unique asset datum or a unique edge datum in the hierarchical dataset. The asset layer value can be based on the hierarchical value of the asset layer. For example, asset layer with the highest hierarchical value can be assigned the largest asset layer value and the asset layer with the lowest hierarchical value can be assigned the smallest asset layer value.

In some implementations, asset data in the hierarchical dataset can be located in the database based on its partition identifier and its local identifier. For example, the partition where the hierarchical dataset is stored can be identified using the partition identifier, and the asset data within the partition can be identified using the local identifier. In some implementations, multiple hierarchical datasets can be stored in a partition. In this case, each asset of the multiple hierarchical datasets is assigned a unique local identifier within the partition. Local identifiers in different partitions may not be unique. For example, a first asset data in a first partition can have the same local identifier as a second asset data in a second partition.

The information in a hierarchical dataset can be stored in multiple tables (e.g., hash table, node table, edge map table, etc.) of the database. In some implementations, the database can have a single hash table that includes identification information (e.g., hash identifier) of assets/edges of multiple hierarchical dataset stored in the database (e.g., where any given hierarchical dataset is stored in one partition of the database). The hash table can also store the partition identifiers for the assets. Based on the partition identifier, the partition where the asset information is stored can be identified. In some implementations, each partition of the database can include a node table that stores various information associated with the nodes of the hierarchical industrial asset. The nodes can include assets (e.g., assets 202-236) and edges (e.g., 252-264). For example, the node table of a partition can include the name, the hash identifier, the local identifier, the partition identifier, the type, information (e.g., operational parameters), etc., of the various assets/edges whose data is stored in the partition. In some implementations, each partition can include an edge map table. The edge map table can include relational information associated with the edges. For example, the edge map table can include the local identifiers of the assets that are connected by an edge.

Figure 3:
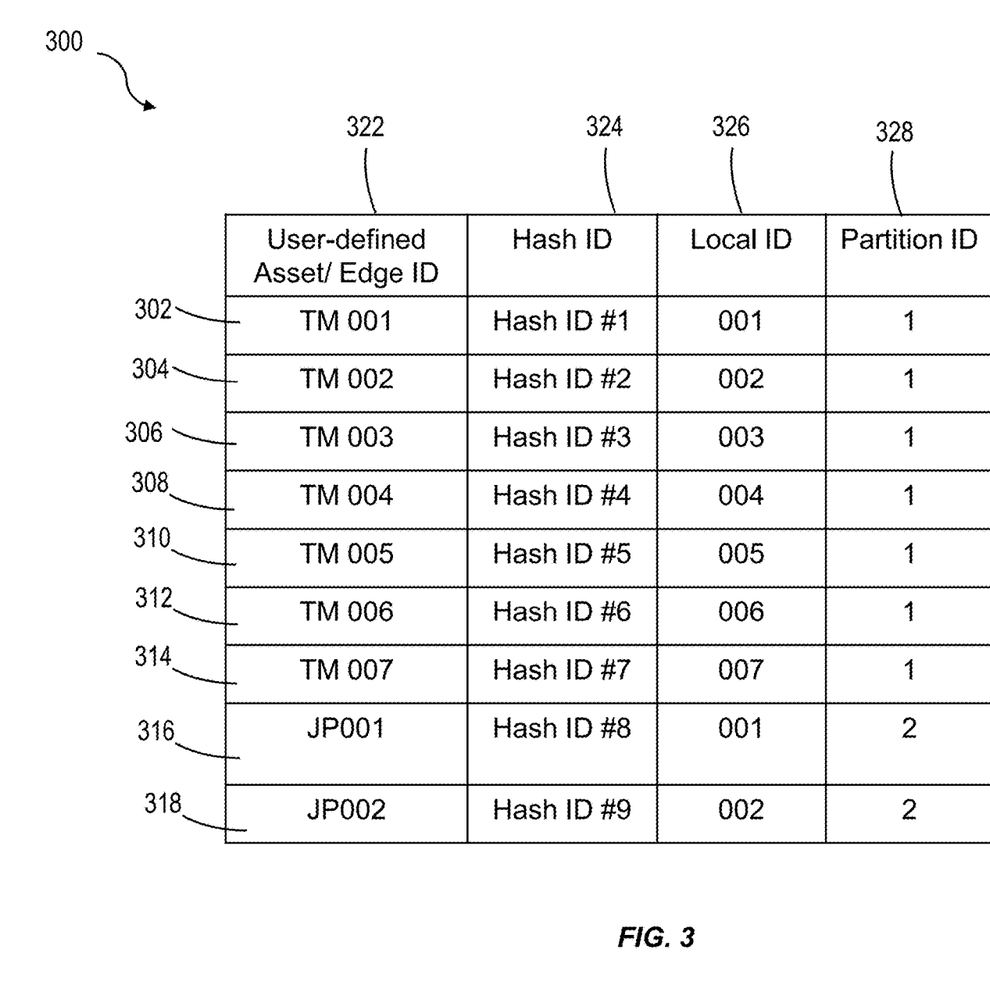
FIG. 3 illustrates an exemplary hash table associated with a database.

FIG. 3 illustrates an exemplary hash table 300. Each node (e.g., asset, edge, etc.) can be assigned a row of the hash table 300 (e.g., asset TM 001 having hash id #1 is assigned row 302, asset TM 002 having hash id #2 is assigned row 304, etc.). The hash table can further include multiple columns that store various asset properties associated with a given asset. For example, column 322, column 324, column 326 and column 328 are assigned to user-defined asset/edge identifiers, hash identifiers, local identifiers and partition identifiers, respectively, of the asset/edge data stored in the various rows. The hash identifiers can be generated by hashing the user-defined asset/edge identifiers (e.g., by a mathematical algorithm). The generated hash identifiers are stored in column 324 of the hash table 300 such that each row includes the user-defined asset/edge identifier and the hash identifier generated by hashing the user-defined asset/edge identifier (e.g., TM 001 and hash Id #1 generated by hashing TM 001 are stored in row 302 and TM 002 and hash Id #2 generated by hashing TM 002 are stored in row 304, etc.). The hash table 300 also includes identification information of assets JP 001 and JP 002 (with partition ID 2) that are stored in a partition different from that in which assets TM 001 and TM002 (with partition ID 1). In some implementations, assets/edge data in different partitions can have the same value for the local identifier. For example, asset TM 001 and JP 001 have 001 as their local identifier.

Figure 4:
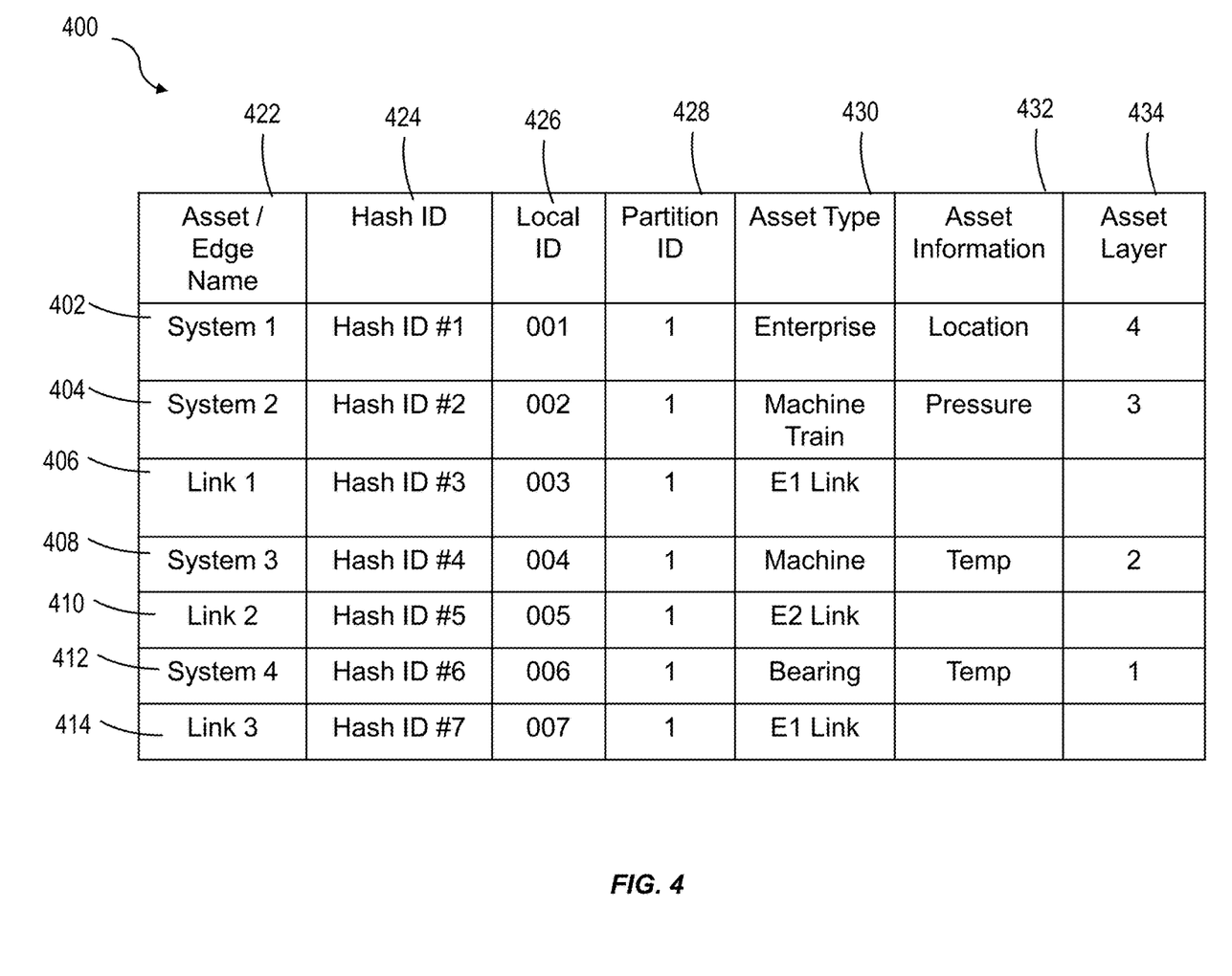
FIG. 4 illustrates an exemplary node table stored in a partition of the database of FIG. 3.

FIG. 4 illustrates an exemplary node table 400 which is stored in a partition having the partition identifier 1. Each node (e.g., asset, edge, etc.) can be assigned a row in the node table 400 (e.g., an asset with the name System 1 having hash id #1 is assigned row 402, edge with the name Link 1 having hash id #3 is assigned row 406, etc.). The node table can further include multiple columns that store various node (e.g., asset, edge, etc.) properties associated with the nodes. For example, column 422, column 424, column 426 column 428, column 430, column 432 and column 434 are assigned to asset/edge name, hash identifier, local identifier, partition identifier, type, information of the asset/edge data stored in the various rows, and asset layer, respectively. As illustrated in FIG. 4, System 1 (e.g., North America site 202) has the highest hierarchical value and is assigned the largest asset layer value (e.g., 4), and System 4 (e.g., input bearing 232, output bearing 234, etc.) has the lowest hierarchical value and is assigned the smallest asset layer value (e.g., 1). System 2 (e.g., Coker unit 214) can be assigned an asset layer value of 3 and System 3 (e.g., shaft 226) is assigned an asset layer value of 2.

Figure 5:
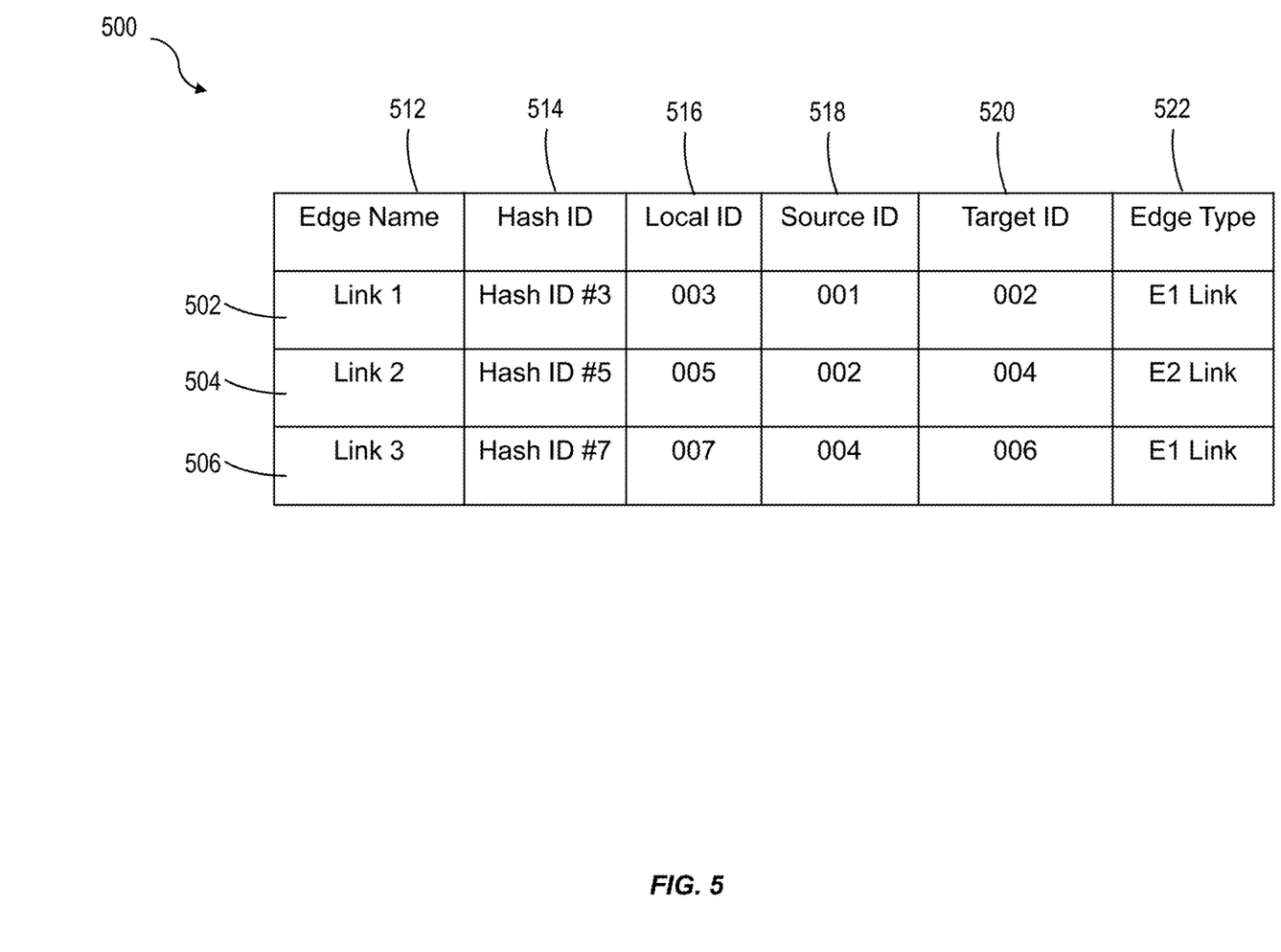
FIG. 5 illustrates an exemplary edge map table stored in the partition of the database of FIG. 3.

FIG. 5 illustrates an exemplary edge map table 500 which is stored in a partition having the partition identifier 1. Each edge can be assigned a row in the edge map table 500 (e.g., an edge with the name Link 1 having hash id #3 is assigned row 502, edge with the name Link 2 having hash id #5 is assigned row 504, etc.). The edge map table can further include multiple columns that store various mapping properties associated with a given edge. For example, column 512, column 514, column 516 and column 522 are assigned to edge name, hash identifier, local identifier, and edge type, respectively. Column 518 is assigned to source identifier (or local identifier of the asset from which an edge originates) and column 520 is assigned to target identifier (or local identifier of the asset at which the edge terminates). For example, for edge 260 (in FIG. 2), the source identifier is the local identifier of the coker unit 214 and the target identifier is the local identifier of the shaft 226.

In some implementations, source code can be human-readable code that can be written in program languages such as python, C++, etc. In some implementations, computer-executable codes can be machine-readable codes that can be generated by compiling one or more source codes. Computer-executable codes can be executed by operating systems (e.g., linux, windows, mac, etc.) of a computing device or distributed computing system. For example, computer-executable codes can include data needed to create runtime environment (e.g., binary machine code) that can be executed on the processors of the computing system or the distributed computing system.

Other embodiments are within the scope and spirit of the disclosed subject matter. For example, the prioritization method described in this application can be used in facilities that have complex machines with multiple operational parameters that need to be altered to change the performance of the machines. Usage of the word "optimize"/"optimizing" in this application can imply "improve"/"improving."

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file.

A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    receiving data characterizing a hierarchical dataset associated with hierarchical industrial assets, the hierarchical dataset comprising a plurality of node data grouped in a plurality of layers comprising a plurality of asset data and a plurality of edge data, wherein an edge datum of the plurality of edge data is indicative of a relation between a pair of asset data of the plurality of asset data, wherein each asset datum of the plurality of asset data represents an asset in the hierarchical industrial assets and each edge datum of the plurality of edge data represents an edge in the hierarchical industrial assets the relation between the pair of asset data of the plurality of asset data defining an operation of a first asset in the pair of asset data that uses as input an output of a second asset in the pair of asset data, the first asset being mechanically coupled to the second asset, wherein the plurality of asset data comprises data detected by a plurality of sensors measuring operations of industrial assets identified by a plurality of user-defined asset identifiers;
    receiving data characterizing a partition identifier associated with the hierarchical dataset;
    assigning, based on the partition identifier, a partition of a database to the hierarchical dataset;
    generating a plurality of hash identifiers by hashing each of the plurality of user-defined asset identifiers; and
    storing the hierarchical dataset and the plurality of hash identifiers, wherein the hierarchical dataset is stored in the partition based on a predetermined template that defines management and retrieval of any portion of the plurality of asset data and the plurality of user-defined asset identifiers is stored in a hash table associated with the database, the hash table comprising the partition identifier.

2. The method of claim 1, further comprising creating the partition in the database, wherein the partition identifier is a new partition identifier.

3. The method of claim 1, further comprising identifying the partition in the database, wherein the partition identifier is a previously defined partition identifier.

4. The method of claim 1, further comprising storing the plurality of asset data in a node table comprising a plurality of rows and a plurality of columns, each asset datum of the plurality of asset data comprising a plurality of asset properties, wherein a first asset datum of the plurality of asset data is assigned a first row of the plurality of rows, wherein a first asset property of the first asset datum is assigned a first column of the plurality of columns and a second asset property of the first asset datum is assigned a second column of the plurality of columns, and wherein the node table is stored in the partition.

5. The method of claim 4, further comprising storing the plurality of edge data in the node table, each edge datum of the plurality of edge data comprising a plurality of edge properties,
wherein a first edge datum of the plurality of edge data is assigned a second row of the plurality of rows,
wherein a first edge property of the first edge datum is assigned a third column of the plurality of columns and a second edge property of the first edge datum is assigned a fourth column of the plurality of columns.

6. The method of claim 4, wherein the plurality of edge data comprises a plurality of user-defined edge identifier, wherein each user-defined asset identifier of the plurality of user-defined asset identifiers is indicative of a unique asset or a unique edge of the hierarchical industrial assets.

7. The method of claim 6, wherein the hash table comprises a plurality of rows and a plurality of columns, wherein a first asset of the hierarchical industrial assets is assigned a first row of the plurality of rows in the hash table, and the plurality of user-defined asset identifiers are assigned a first column of the plurality of columns.

8. The method of claim 1, further comprising providing a hierarchical dataset template comprising a plurality of asset templates and a plurality of edge templates, wherein the hierarchical dataset is generated by at least populating a first asset data of the plurality of assets data in a first asset template of the plurality of asset templates, and by at least populating a first edge data of the plurality of edge data in a first edge template of the plurality of edge templates.

9. The method of claim 1, further comprising assigning a first set of local identifiers to the hierarchical dataset, wherein each local identifier of the first set of local identifier is associated with a unique asset datum or a unique edge datum in the hierarchical dataset.

10. The method of claim 1, wherein the hierarchical industrial assets comprise one or more of pumps, compressors, turbines, shafts, shaft coupling, input bearings, output bearings and machine train.

11. A system comprising:
at least one data processor;
memory coupled to the at least one data processor, the memory storing instructions to cause the at least one data processor to perform operations comprising:
receiving data characterizing a hierarchical dataset associated with hierarchical industrial assets, the hierarchical dataset comprising a plurality of node data grouped in a plurality of layers comprising a plurality of asset data and a plurality of edge data, wherein an edge datum of the plurality of edge data is indicative of a relation between a pair of asset data of the plurality of asset data, wherein each asset datum of the plurality of asset data represents an asset in the hierarchical industrial assets and each edge datum of the plurality of edge data represents an edge in the hierarchical industrial assets the relation between the pair of asset data of the plurality of asset data defining an operation of a first asset in the pair of asset data that uses as input an output of a second asset in the pair of asset data, the first asset being mechanically coupled to the second asset, wherein the plurality of asset data comprises data detected by a plurality of sensors measuring operations of industrial assets identified by a plurality of user-defined asset identifiers;
receiving data characterizing a partition identifier associated with the hierarchical dataset;
assigning, based on the partition identifier, a partition of a database to the hierarchical dataset;
generating a plurality of hash identifiers by hashing each of the plurality of user-defined asset identifiers; and
storing the hierarchical dataset and the plurality of hash identifiers, wherein the hierarchical dataset is stored in the partition based on a predetermined template that defines management and retrieval of any portion of the plurality of asset data and the plurality of user-defined asset identifiers is stored in a hash table associated with the database, the hash table comprising the partition identifier.

12. The system of claim 11, wherein the operations further comprising creating the partition in the database, wherein the partition identifier is a new partition identifier.

13. The system of claim 11, wherein the operations further comprising identifying the partition in the database, wherein the partition identifier is a previously defined partition identifier.

14. The system of claim 11, wherein the operations further comprising storing the plurality of asset data in a node table comprising a plurality of rows and a plurality of columns, each asset datum of the plurality of asset data comprising a plurality of asset properties, wherein a first asset datum of the plurality of asset data is assigned a first row of the plurality of rows, wherein a first asset property of the first asset datum is assigned a first column of the plurality of columns and a second asset property of the first asset datum is assigned a second column of the plurality of columns, and wherein the node table is stored in the partition.

15. The system of claim 14, wherein the operations further comprising storing the plurality of edge data in the node table, each edge datum of the plurality of edge data comprising a plurality of edge properties,
wherein a first edge datum of the plurality of edge data is assigned a second row of the plurality of rows,
wherein a first edge property of the first edge datum is assigned a third column of the plurality of columns and a second edge property of the first edge datum is assigned a fourth column of the plurality of columns.

16. The system of claim 14, wherein the plurality of edge data comprises a plurality of user-defined edge identifier, wherein each user-defined asset identifier of the plurality of user-defined asset identifiers is indicative of a unique asset or a unique edge of the hierarchical industrial assets.

17. The system of claim 16, wherein the operations wherein the hash table comprises a plurality of rows and a plurality of columns, wherein a first asset of the hierarchical industrial assets is assigned a first row of the plurality of rows in the hash table, and the plurality of user-defined asset identifiers are assigned a first column of the plurality of columns.

18. The system of claim 11, wherein the operations further comprising providing a hierarchical dataset template comprising a plurality of asset templates and a plurality of edge templates, wherein the hierarchical dataset is generated by at least populating a first asset data of the plurality of assets data in a first asset template of the plurality of asset templates, and by at least populating a first edge data of the plurality of edge data in a first edge template of the plurality of edge templates.

19. The system of claim 11, wherein the operations further comprising assigning a first set of local identifiers to the hierarchical dataset, wherein each local identifier of the first set of local identifier is associated with a unique asset datum or a unique edge datum in the hierarchical dataset.

20. The system of claim 11, wherein the hierarchical industrial assets comprise one or more of pumps, compressors, turbines, shafts, shaft coupling, input bearings, output bearings and machine train.

21. A computer program product comprising a non-transitory machine-readable medium storing instructions that, when executed by at least one programmable processor that comprises at least one physical core and a plurality of logical cores, cause the at least one programmable processor to perform operations comprising:

receiving data characterizing a hierarchical dataset associated with hierarchical industrial assets, the hierarchical dataset comprising a plurality of node data grouped in a plurality of layers comprising a plurality of asset data and a plurality of edge data, wherein an edge datum of the plurality of edge data is indicative of a relation between a pair of asset data of the plurality of asset data, wherein each asset datum of the plurality of asset data represents an asset in the hierarchical industrial assets and each edge datum of the plurality of edge data represents an edge in the hierarchical industrial assets the relation between the pair of asset data of the plurality of asset data defining an operation of a first asset in the pair of asset data that uses as input an output of a second asset in the pair of asset data, the first asset being mechanically coupled to the second asset, wherein the plurality of asset data comprises data detected by a plurality of sensors measuring operations of industrial assets identified by a plurality of user-defined asset identifiers;

receiving data characterizing a partition identifier associated with the hierarchical dataset;

assigning, based on the partition identifier, a partition of a database to the hierarchical dataset;

generating a plurality of hash identifiers by hashing each of the plurality of user-defined asset identifiers; and storing the hierarchical dataset and the plurality of hash identifiers, wherein the hierarchical dataset is stored in the partition based on a predetermined template that defines management and retrieval of any portion of the plurality of asset data and the plurality of user-defined asset identifiers is stored in a hash table associated with the database, the hash table comprising the partition identifier.

* * * * *